(12) United States Patent
Hensley et al.

(10) Patent No.: US 6,432,299 B1
(45) Date of Patent: Aug. 13, 2002

(54) CUTTINGS DRYER FOR REMOVING LIQUID FROM A SLURRY

(75) Inventors: Gary L. Hensley, Kingwood; Lee Hilpert, Livingston, both of TX (US)

(73) Assignee: Hutchison-Hayes International, Inc., Houston, TX (US)

( * ) Notice: Subject to any disclaimer, the term of this patent is extended or adjusted under 35 U.S.C. 154(b) by 0 days.

(21) Appl. No.: 09/620,844

(22) Filed: Jul. 21, 2000

(51) Int. Cl.[7] .......................................... B01D 33/067
(52) U.S. Cl. ................... 210/87; 210/360.1; 210/380.1; 210/380.3; 210/394
(58) Field of Search ............................ 210/394, 87, 97, 210/103, 104, 396, 398, 408, 360.1, 380.1, 380.3

(56) References Cited

U.S. PATENT DOCUMENTS

| | | | |
|---|---|---|---|
| 1,870,485 A | * 8/1932 | Becraft ........................ | 210/394 |
| 3,401,801 A | * 9/1968 | Wedemeyer et al. ........ | 210/394 |
| 4,844,799 A | * 7/1989 | Lee ............................. | 210/394 |
| 5,435,917 A | * 7/1995 | Sato ............................ | 210/394 |
| 5,616,245 A | 4/1997 | Albrecht ..................... | 210/371 |
| 5,667,681 A | 9/1997 | Magrecki et al. ........... | 210/374 |
| 5,720,879 A | 2/1998 | Cope ........................... | 210/369 |
| 5,855,800 A | 1/1999 | Serenkin ..................... | 210/781 |
| 5,882,524 A | 3/1999 | Storey et al. ............... | 210/712 |
| 5,897,774 A | 4/1999 | Cope ........................... | 210/369 |
| 6,030,532 A | 2/2000 | Racine ..................... | 210/360.1 |

OTHER PUBLICATIONS

P. 8.5 from *Decanting Centrifuges*, of Chevron Corporation.

* cited by examiner

*Primary Examiner*—Robert J. Popovics
(74) *Attorney, Agent, or Firm*—Browning Bushman P.C.

(57) ABSTRACT

A method and apparatus are provided for receiving the solids discharge of a centrifuge, shaker, or other clarification system and further drying the solids discharge. The influent into the apparatus of the invention is in the form of a slurry, such as for example the solids discharge of a shaker or centrifuge in a drilling mud clarification system. The apparatus comprises a horizontal screen rotated at a high rate of speed to remove liquid from the slurry by centrifugal force. The horizontal screen is retained by a squirrel cage rotor so that high G-forces can be obtained. Within the horizontal screen is a screw conveyor which rotates at a speed slightly slower than the horizontal screen to define a controllable conveyor speed. In this way, the residence time of the solids in contact with the horizontal screen can be controlled to provide a drier solids discharge from the apparatus. The solids and liquids are provided with separate discharge ports.

18 Claims, 4 Drawing Sheets

CUTTINGS DRYER FOR REMOVING LIQUID FROM A SLURRY

BACKGROUND OF THE INVENTION (1) Field of the Invention

The present invention relates generally to fluid clarification systems and, more particularly, to a system and method of solids from a slurry, particularly drilling mud which has already been clarified.

(2) Description of Related Art

The present invention provides a centrifugal separation system which may be used on a drilling rig. When an oil well is drilled, it is necessary to drill the well with drilling fluid, commonly referred to in the art as drilling mud. The drilling mud is provided to lubricate and cool the drill bit and to carry away cuttings as the mud flows upwardly in the annular flow space around the drill string. The drilling mud is pumped down the drill string to pick up the cuttings and other debris. Commonly, the drilling mud is water but it is sometimes made with an oil, an oil-based carrier, or a diesel-based fluid.

While circulating through the well, drilling mud picks up particles of the earth formations cut by the drill bit. It is relatively easy to clean the drilling mud if the cuttings are primarily heavy rock. Also, large particle cuttings are easily removed from the mud by passing the drilling mud through a set of screens. In general, as mud is returned to the surface, it typically flows into a mud pit and then is pumped out of the mud pit by a mud pump. While flowing from the well to the mud pit and then back to the mud pump, the mud typically is treated by a number of devices to restore the mud to its original condition, such devices including shale shakers, desanders, degassers, and other cleaning devices. The present invention is particularly adapted to receive wet drill cuttings from a shale shaker, but may also be positioned downstream from a centrifugal separator or separator system.

At times, the mud will simply be permitted to sit in an open pit. This enables the heavy particles in the mud to settle to the bottom. Gas bubbles also are removed so that entrained gas bubbles do not create a risk of explosion by accumulating odorless natural gas around the mud pits. Drilling mud with such entrained gas is also too light for almost all applications.

As previously described, drilling mud returning from down hole comprises a fluid such as water or a synthetic oil, high gravity materials added to the drilling mud, and low gravity solids (i.e., cuttings) from the drilling operation. The drilling mud is typically run through one or more centrifuges to remove as much of the cuttings as possible so that the drilling mud can be recirculated. After removing as much of the liquid as possible so that it is reclaimed, there remains a slurry of discharge solids with some entrained liquids remaining. Even the most efficient known centrifugal systems leave liquids in the slurry, typically 10% or more by weight. Recent changes in regulations from the Environmental Protection Agency specify that the solids discharge from offshore drilling platforms can contain no more than 4.3% by weight of oil based drilling mud. As previously mentioned, the cuttings dryer of this invention may receive such a slurry from a centrifuge and dry the cuttings in conformity with this or even more stringent requirements.

One known system for drying the slurry, whether from a centrifuge system or from a shaker on an offshore rig, includes a spinning frustoconical basket into which the slurry is directed. The slurry enters the basket at the bottom, narrow part of the cone, where centrifugal forces sling the slurry toward the wider part of the cone and away from the axis of rotation of the basket. Typically, the slurry remains in the basket for roughly three seconds, during which time some of the liquid from the slurry passes through the basket for recycling, while the now drier slurry is captured for disposal. Unfortunately, the length of time that the slurry remains in the basket is insufficient to adequately dry the slurry. If the basket is made longer, in order to retain the slurry in basket for a longer period, then the basket and accompanying drive system become so large that placement of the system on an offshore rig where space is at a premium becomes problematic. Also, with such a large system, the available spots on an offshore rig where the system can be positioned, and still be located close to where the slurry is being generated is also difficult. If the system cannot be placed close to the initial drying system which generates the slurry, then some sort of transport system must be developed at significant expense.

Another known centrifugal system is adapted for classifying cuttings. This system generally includes a cylindrical portion and a frustoconical portion, with the region of the bowl around the cylindrical portion defining a pool, and the region of the bowl around the frustoconical portion defining a beach. A screw conveyor picks up cuttings separated by centrifuge force into the bottom of the pool, and drive the cuttings up onto the beach for discharge. Such a system has not previously been adapted for drying cuttings from a slurry, not is it well adapted for this application.

Thus, there is a pressing need for a drying system which can effectively receive the slurry from a clarification system such as a shaker or a centrifuge and further remove liquid from the slurry. Such a system should be compact, so that it can be positioned within the limited space of an offshore platform, without the need for expensive and cumbersome transport systems. Also, the system should be capable of providing a solids discharge within EPA regulations.

The invention of the present invention is directed to this need in the art.

SUMMARY OF THE INVENTION

The present invention provides a method and apparatus for receiving the solids discharge of a centrifuge or other clarification system and further drying the solids discharge. The influent into the apparatus of the invention is in the form of a slurry, such as for example the solids discharge of centrifuge in a drilling mud clarification system. The apparatus comprises a horizontal screen rotated at a high rate of speed to remove liquid from the slurry by centrifugal force. The horizontal screen is retained by a squirrel case rotor so that high G-forces can be obtained. Within the horizontal screen is a screw conveyor while rotates at a speed slightly slower than the horizontal screen to define a controllable conveyor speed. In this way, the residence time of the solids in contact with the horizontal screen can be controlled to provide a drier solids discharge from the apparatus. The solids and liquids are provided with separate discharge ports.

The liquid discharge from the apparatus is recirculated to the drilling mud system for recirculation downhole. The solids discharge has less than 4.3% entrained liquid, within regulations for discharge to the environment.

It is thus an object of the invention to provide an improved, self-contained slurry processing system to further remove solids from drilling mud or other liquid influent having entrained solids. The system is compact so that it can more easily be installed in small spaces close to earlier stages of a purification system, thereby reducing the complexity and cost of transporting the slurry to the dryer. The system includes a control system to effectively control the residence time of the solids in contact with the horizontal screen to control the quantity of liquids which are removed from the slurry.

These and other features of the invention will be apparent to those skilled in the art from a review of the following detailed description along with the accompanying drawings.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF PREFERRED EMBODIMENTS

Figure 1:
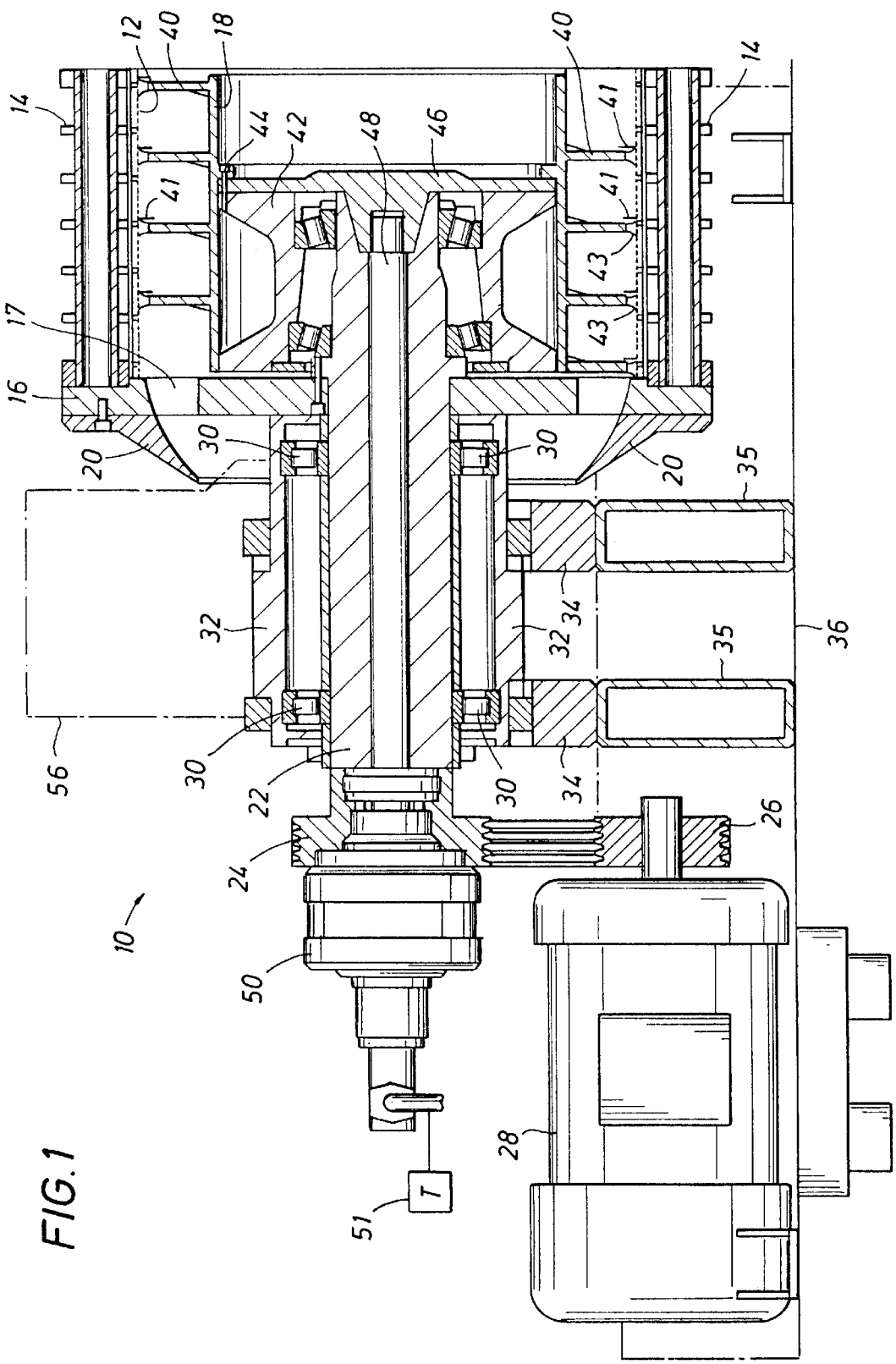
FIG. 1 is an elevation view of the apparatus of the invention.

FIG. 1 depicts a side elevation view of the apparatus of this invention. The apparatus will referred to as a cuttings dryer 10, although the apparatus may be used in applications other than drilling mud systems. The cuttings dryer 10 comprises a rotating cylindrical screen 12 which spins at a high rate of speed. It has been shown, for the separation of cuttings from liquid, that cuttings dryness improves with G-force up to about 500 G's, but that further improvement is not realized for higher G-forces. Thus, the rotating screen spins at a rate to achieve at least 500 G's. The screen is retained by a cylindrical squirrel cage 14 for mechanical rigidity. The screen and squirrel case rotate as one unit. Further, unlike known separators, the screen and squirrel cage have no conical section. They are mounted to and rotated by a feed hub 16 which includes a plurality of ports 17 to direct a slurry onto the screen. The slurry thus first encounters the screen at the left hand side as viewed in FIG. 1 and is scrolled to the right by a screw conveyor 18. Note also that the screw conveyor has no conical segment. Thus, the solids separation components may be said to be "beachless" and that term is used to define that the separator includes no pool, no solid bowl rotating at a differential speed from the screw conveyor, and no shallow end of the pool unto which the screw conveyor moves solids which have been removed from the slurry by centrifugal force.

Mounted on the left of and turning with the feed hub 16 is an accelerator plate 20. The accelerator plate is preferably formed of a urethane material. The feed hub 16 is also mounted to a hollow drive shaft 22 which terminates on its left hand end with a drive sheave 24. The drive sheave 24 is driven by a V-belt (FIG. 2) which is attached to a mating drive pulley 26 on a prime mover such as a motor 28.

The hollow drive shaft 22 for driving the screen is supported by a set of bearings 30 which are retained in a casing 32. The casing 32 is supported on pillow blocks 34 which are rigidly mounted on a corresponding pedestals 35 which are part of a support frame 36, such as for example on a skid or other portable support frame. Alternatively, the cuttings dryer 10 may be installed directly onto a drilling rig or other mount.

The screw conveyor 18 includes a helical screw 40 with a diameter that brings it in close proximity to but not touching the screen in order to pick up solids caught on the interior surface of the screen and to convey the solids to the right as shown in FIG. 1. At the end of the flite of the screw conveyor is a plurality of carbide tiles 41 for greater wear resistance. Along the trailing edge of the flite of the screw conveyor is a wiper 43, preferably made or urethane, which is positioned in abutting contact with the screen 12 to wipe debris which may clog the screen. The feature is provided to help remove fibrous loss circulation material which may be returned with drill cuttings.

Liquid from the slurry passes through the screen, and drops by gravity into a liquids discharge, described below. The screw conveyor 18 is mounted to and driven by a conveyor bearing hub 42, which in turn in joined to a drive plate 46. The conveyor bearing hub 42 is mounted to the conveyor drive plate 46 with a set of screws 44, for example. The conveyor drive plate 46 is also mounted to a solid conveyor drive shaft 48 which fits inside the hollow drive shaft 22. The left end of the conveyor drive shaft terminates at a variable-speed hydraulic drive unit 50, which drives the conveyor drive shaft at a variably selected conveyor speed. The hydraulic drive unit 50 is driven by the prime mover 28 and functions as a differential to drive the screw conveyor at scroll speed which may be varied depending on the rate of slurry entering the dryer. The conveyor speed is selected so that solids remain within the cylinder defined by the screen for a period sufficient to remove an adequate amount of liquid from the influent slurry.

The speed of the hydraulic drive unit 50 preferably provides a controlled torque on the screw conveyor as sensed by a torque sensor 51. The torque sensor 51 is preferably a pressure sensor, since hydraulic pressure to the hydraulic drive unit 50 directly relates to torque on the screw conveyor. In this way, the torque may be set at some fraction of maximum rated torque on the drive unit 50, in order to retain the solids with as long a residence time in the interior of the screen as possible to maximize fluid removal from the cuttings.

To provide some perspective regarding the size of the cuttings dryer 10, the overall height and width of the cuttings dryer 10, including the support frame 36, are both roughly 51", and the overall length including a surrounding enclosure (FIG. 2) is about 97.4". This compares with other known cuttings dryers, one of which is roughly 17' tall on a 10 feet by 10 feet footprint, and another which is 8' tall on a 6 feet by 6 feet footprint.

Figure 2:
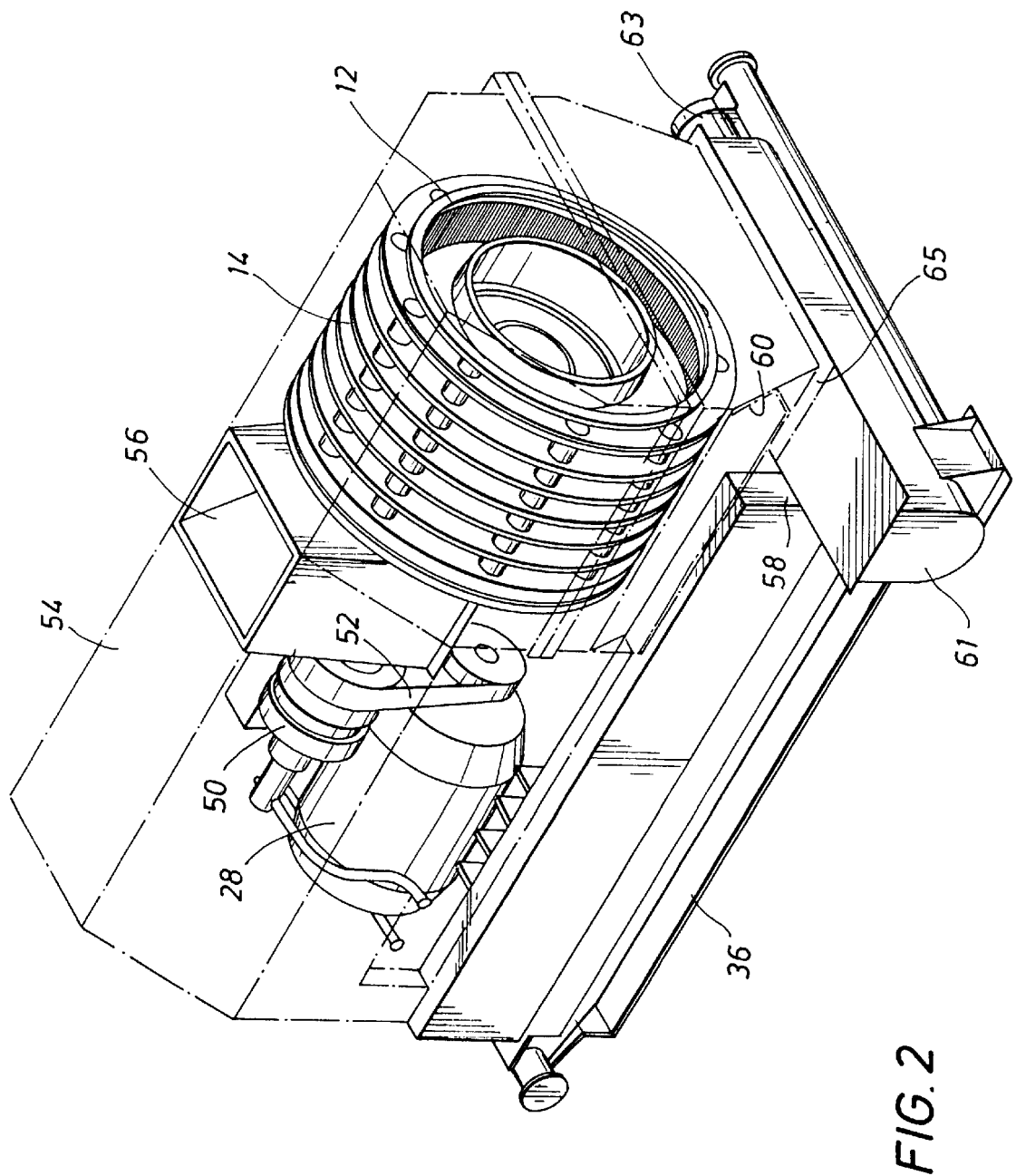
FIG. 2 is a perspective view of the apparatus depicted in FIG. 1.

FIG. 2 places these dimensions into greater perspective. The motor 28 is coupled to the drive sheave 24 by a V-belt 52 to the drive squirrel cage 14. All of this structure is mounted within an enclosure 54 atop the supporting frame 36. The enclosure 54 includes an inlet chute 56 which receives the slurry from a previous solids removal process, such as a shaker or a centrifuge. Liquid passes radially outwardly through the screen 12 and out into the enclosure 54 where it gravity drains through a liquid outlet chute 58. Dry solids with less than 4.3% liquid are discharged from the cuttings dryer 10 down an outlet ramp 60 for disposal.

The cuttings drier may also include mass flow sensors upstream of the inlet chute 56 and downstream of the outlet ramp 60. A mass flow sensor 61 is shown in FIG. 2 at the outlet ramp of the system. The system preferably includes a similar mass flow sensor upstream of the inlet chute, but such a sensor is omitted from FIG. 2 for clarity. The mass flow sensor includes a set of sensors which detect the weight of the sensor (and the differential weight is therefore the weight of the solids in the discharge), and velocity of the solids is determined from the speed of an internal screw conveyor, as determined by the speed of a motor 63. Measuring mass flow into and out of the machine provides a measure of the effectiveness of the machine in removing liquid from the slurry for discharge, and offers a way to prove that discharge is within regulations. Solids discharge down the ramp 60 directly into the mass flow sensor, and the coupling is sealed by a flanged connection 65 but the flanged connection does not sit upon the mass flow sensor. Otherwise, it would contribute its weight and vibration to the mass flow sensor and make a mass flow reading more difficult.

Figure 3:
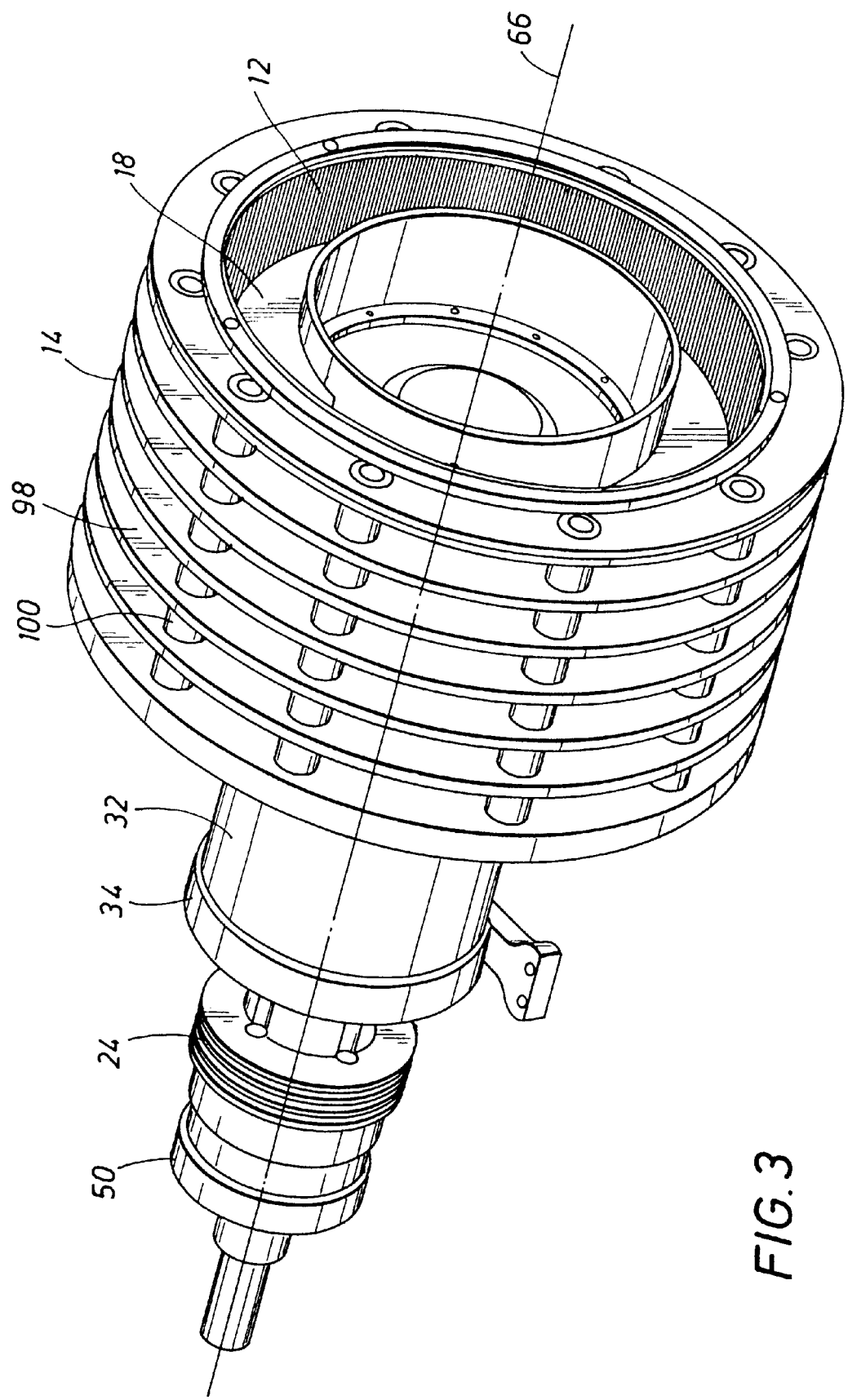
FIG. 3 is a perspective view of the rotating components of the apparatus of FIG. 2.

FIG. 3 provides a perspective view of the squirrel cage 14 and screen 12 removed from the cuttings dryer 10 so that the orientation of the components may be better understood. The hydraulic drive unit 50 drives the screw conveyor 18 and the drive sheave 24 drives the screen 12 and squirrel cage 14. The squirrel cage 14 is supported by the stationary casing 32 (shown also in FIG. 1) for bearing support on the pillow block 34. The pillow block is mounted on and supported by the left most of the pedestals 35 (FIG. 1). The components depicted in FIG. 3 are co-axial with an axis 66.

Figure 4:
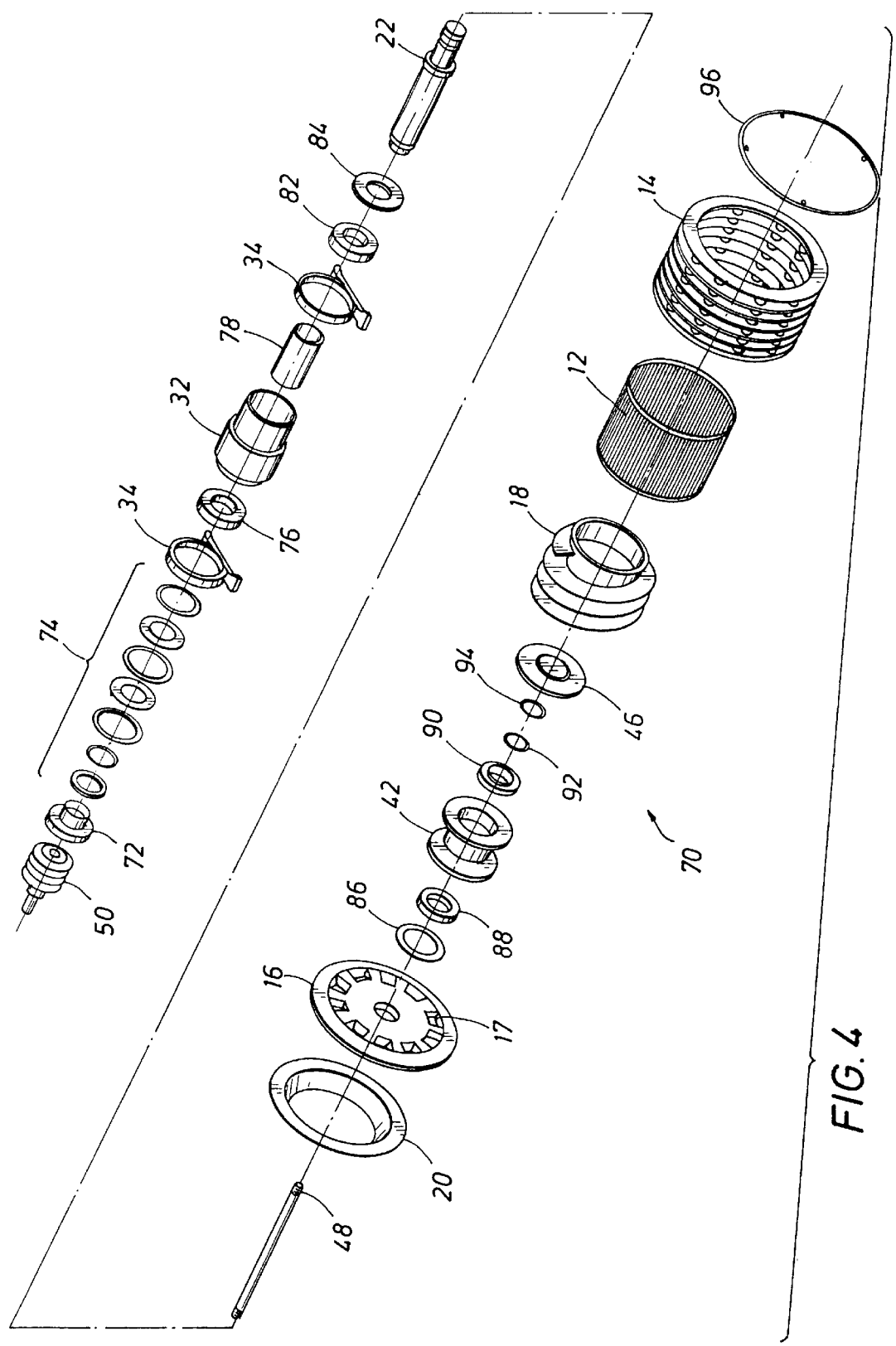
FIG. 4 is an exploded view of the rotating components depicted in FIG. 3.

Finally, FIG. 4 is an exploded view of a rotary assembly 70 of the cuttings dryer. The exploded view is provided to illustrate how the rotary assembly 70 is preferably constructed. Starting on the extreme left with the hydraulic drive unit 50, the assembly includes an adapter 72 to coupled the hydraulic drive unit 50 to the solid drive shaft 48 for the screw conveyor. A seal plate assembly 74 seals off the interior space of the casing 32. Next, to the right of the pillow block 34 is a drive bearing 76, the casing 32, a spacer 78, and a pillow block 34. To the right of the pillow block 34 is a drive bearing 82, a seal plate retainer 84 and the hollow drive shaft 22.

Rotary movement between the screw conveyor and screen/squirrel cage is supported by a pair of bearings 88 and 90 which fit within the conveyor bearing hub 42 and sealed by a seal housing 86. The bearings 88 and 90 are in turn secured to the conveyor drive plate 46 with a lock washer 92 and lock nut 94. The screen is held to the assembly with a screen retaining ring 96.

Returning briefly to FIG. 3, the squirrel cage 14 is preferably formed of a plurality of disk shaped plates 98 held rigidly into a frame with a plurality of longitudinal rods 100. This structure provides mechanical rigidity while minimizing the weight of the structure, and further while permitting fluid to pass freely through the squirrel cage. Importantly, this structure also permits easy removal and replacement of the screen and the screw conveyor, the principal wear components of the system.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A centrifugal cuttings dryer comprising:
    a. a cylindrical screen defaming an interior surface;
    b. an axially oriented cylindrical squirrel cage surrounding and supporting the screen, the squirrel cage adapted to spin the screen at high speed;
    c. an inlet to direct a slurry from a source onto the interior surface of the screen, whereby the screen captures solids from the slurry while permitting liquid from the slurry to pass through the screen by centrifugal force; and
    d. an axially oriented screw conveyor including a cylindrical conveying cylinder to convey the solids off of the screen, the squirrel cage coaxial with the screw conveyor.

2. The dryer of claim 1, wherein the inlet comprises a gravity feed inlet chute.

3. The dryer of claim 1, further comprising a prime mover to rotate the screen at a first speed and the screw conveyor at a second speed.

4. The dryer of claim 3, further comprising a hollow shaft coupling the prime mover to the screen and a solid shaft coaxial with the hollow shaft coupling the prime mover with the screw conveyor.

5. The dryer of claim 4, further comprising a differential coupling the prime mover with the solid shaft to drive the screw conveyor at a selected speed differential from the speed of the screen.

6. The dryer of claim 5, wherein the differential coupling comprises a variable speed hydraulic drive unit.

7. The dryer of claim 5, wherein the differential is adapted to maintain constant torque on the screw conveyor.

8. The cuttings dryer of claim 1, further comprising an enclosure surrounding the screen, the squirrel cage, and the screw conveyor, and wherein the inlet penetrates the enclosure.

9. The cuttings dryer of claim 8, further comprising a liquids discharge from the enclosure.

10. The cuttings dryer of claim 1, further comprising an accelerator to direct the slurry from the inlet onto the screen.

11. The cuttings dryer of claim 10, further comprising an inlet hub between the accelerator and the screen, wherein the squirrel cage and the screen are mounted to the inlet hub, and the inlet hub defines a plurality of ports therethrough.

12. The cuttings dryer of claim 1, wherein the dryer is adapted to be positioned adjacent the source of the slurry.

13. The cuttings dryer of claim 1, wherein the screw conveyor comprises:
    a. an axially oriented cylinder;
    b. a helical flite around the cylinder; and
    c. a plurality of tiles mounted on the flite.

14. The cuttings dryer of claim 13, wherein the tiles are carbide.

15. The cuttings dryer of claim 13, further comprising a wiper on the flite, the wiper adapted for wiping contact with the screen.

16. The cuttings dryer of claim 1, further comprising a solids discharge to carry solids away from the screw conveyor.

17. The cuttings dryer of claim 16, further comprising:
    a. an inlet mass flow sensor at the inlet; and
    b. an outlet mass flow sensor at the solids discharge.

18. In a cuttings dryer having:
    a. a prime mover,
    b. a pair of co-axial shafts coupled to the prime mover, and
    c. a solids separator coupled to the shafts,
    the improvement comprising a removable component in the solids separator, the removable component comprising a cylindrical screen defining an interior surface, the cylindrical screen coupled to one of the co-axial shafts and surrounding a screw conveyor mounted to the other of the co-axial shafts.

* * * * *